May 29, 1923.
R. T. RUSH
1,456,912
QUARTER SAWING MACHINE
Filed May 29, 1922
4 Sheets-Sheet 1
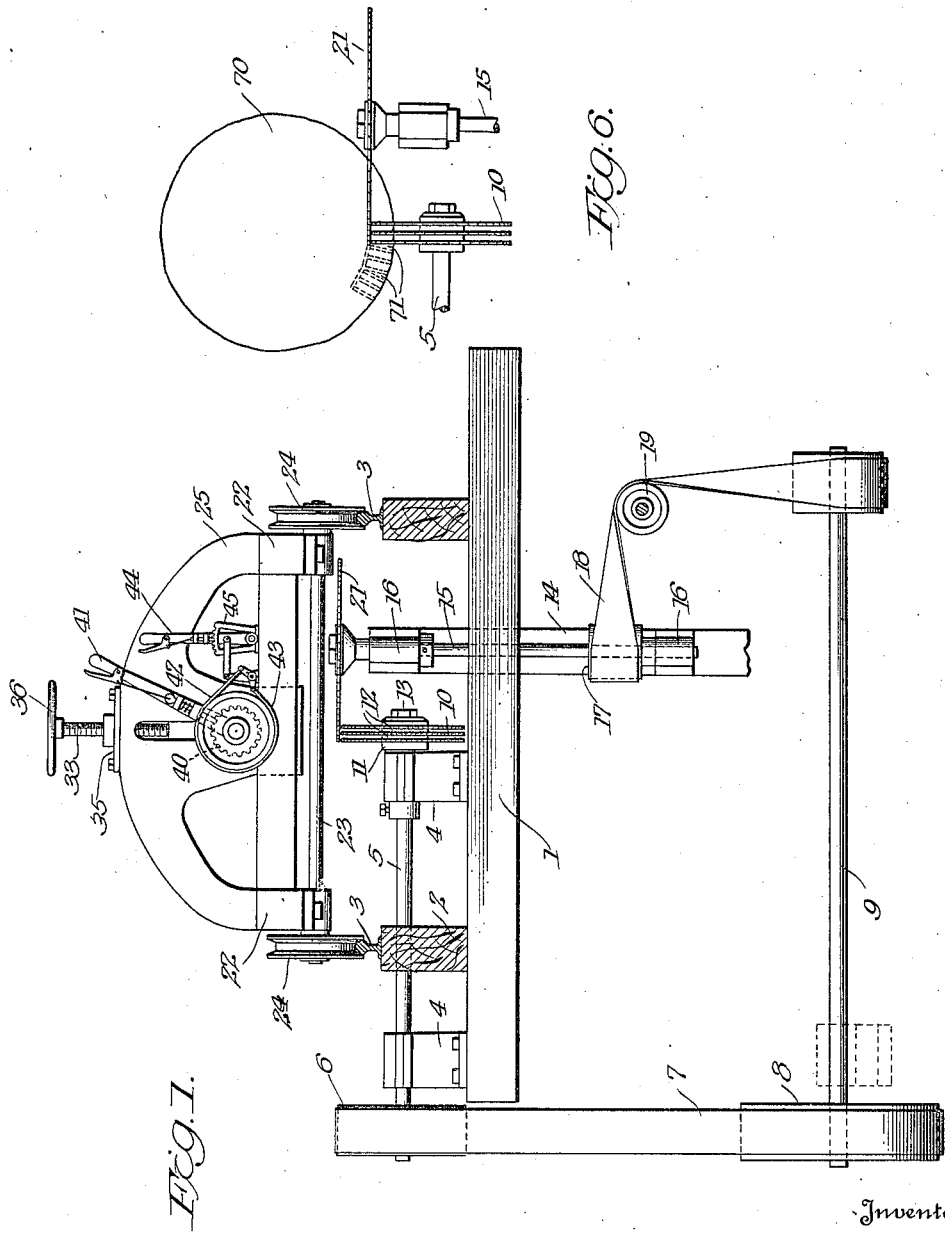
Inventor:
Robert T. Rush.
By Emery, Booth, Janney & Varney
his Attorneys

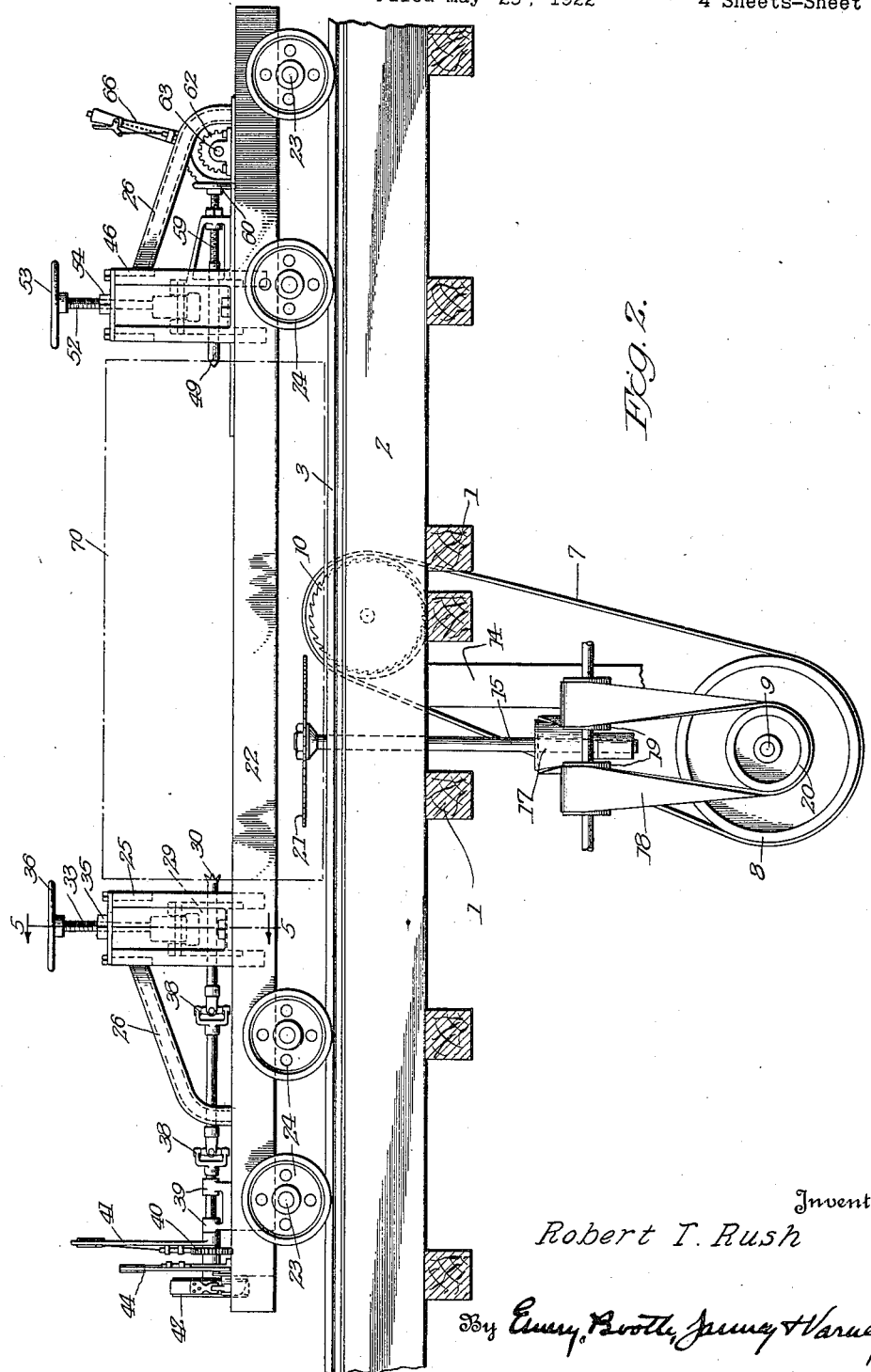

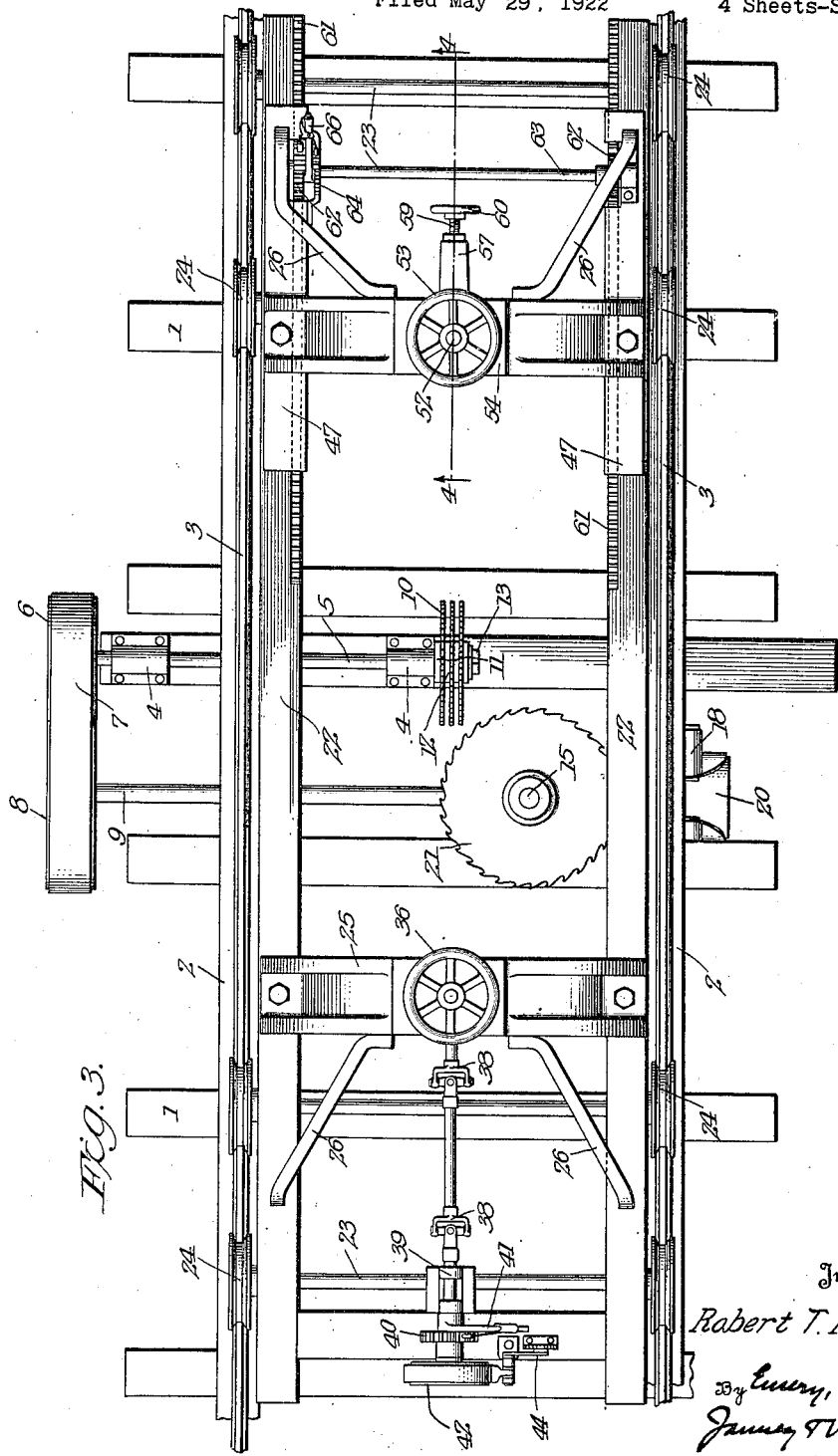

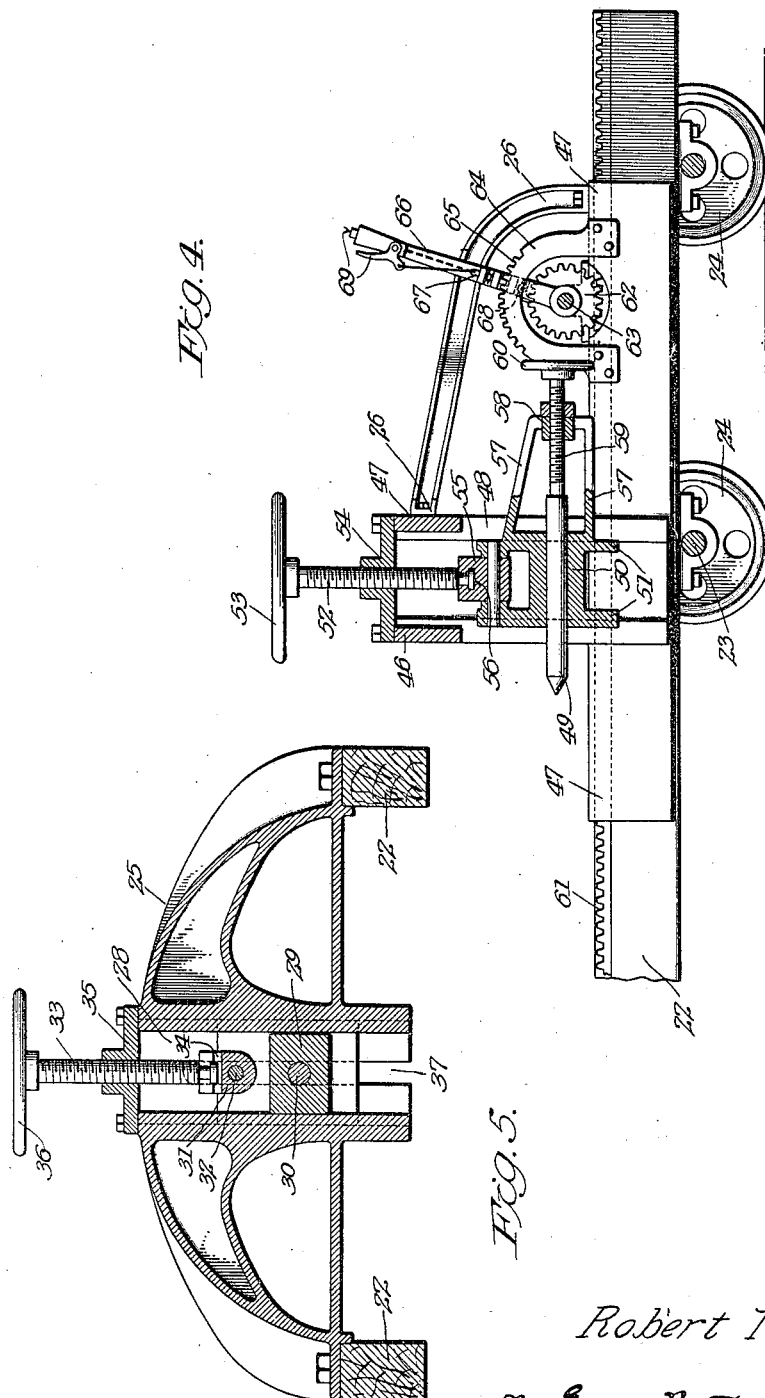

Patented May 29, 1923.

1,456,912

UNITED STATES PATENT OFFICE.

ROBERT THEODORE RUSH, OF HATTIESBURG, MISSISSIPPI.

QUARTER-SAWING MACHINE.

Application filed May 29, 1922. Serial No. 564,443.

*To all whom it may concern:*

Be it known that I, ROBERT THEODORE RUSH, a resident of Hattiesburg, in the county of Forrest and State of Mississippi, have invented an Improvement in Quarter-Sawing Machines, of which the following description, in connection with the accompanying drawings, is a specification, like characters on the drawings representing like parts.

This invention relates to quarter sawing machines and is especially adapted for cutting logs across the grain.

My invention aims to provide an improved machine for cutting squared lumber, such as rift or quarter sawed flooring, radially across the grain of the log, and also aims to increase the output of the mill and minimize waste.

Other aims and advantages will appear in the following description of the illustrative embodiment of the invention shown in the accompanying drawings, wherein:

Figure 1 is an end elevation of a preferred form of machine;

Fig. 2 is a side elevation of the machine shown in Fig. 1;

Fig. 3 is a top plan view;

Fig. 4 is a longitudinal mid-section on the line 4—4 of Fig. 3;

Fig. 5 is a transverse section on the line 5—5 of Fig. 2; and

Fig. 6 is an end view of a log showing the relative positions of the saws for making the first cut of squared lumber.

Referring to the drawings, wherein I have shown the preferred embodiment of my invention for illustrative purposes, I provide a frame comprising transverse cross beams or ties 1 (Fig. 1) and longitudinal sills 2 on which the usual rails 3 for the carriage are mounted. On one of the cross beams 1 a pair of spaced journal boxes or suitable bearings 4 are secured as by bolts. A shaft or arbor 5 is mounted in the bearings 4 and carries a pulley 6 on its outer end adapted to be driven by a belt 7 connected to a large pulley 8 on a power shaft 9. On the other end of the shaft 5 three vertical circular saws 10 are held fixed thereto and in spaced relation by a large fixed collar 11, spacing collars 12, and a nut 13 arranged on the threaded end of the shaft to hold the saws in frictional engagement with the collars. The three saws are equally spaced a distance equal to the desired thickness of the lumber to be cut.

A vertical column 14 (Fig. 1) preferably extends upwardly between the cross beams 1 to one side of the center of the tracks 3 and in advance of the vertical saws 10, and carries a vertical shaft or arbor 15 in bearings 16. A pulley 17, fixed to the shaft above the lower bearing 16, is driven by a belt 18 passing over a pair of horizontal idle pulleys 19 and around a pulley 20 on the power shaft 9 (Fig. 2). A horizontal circular saw 21 is fixed to the upper end of the shaft 15 in a well known manner. The plane of the circular saw 21 is substantially tangent to the vertical saws 10 and is adapted to cut across the kerf made by the vertical saw 10 on the extreme left (see Fig. 1).

A carriage is mounted to reciprocate above the saws on the tracks 3 (Fig. 2) and comprises two carriage sills 22 under which suitable axles 23 carrying grooved wheels or trucks 24 are mounted as by journal boxes of a well known construction.

A head stock or block 25, substantially semicircular in end elevation (Figs. 1 and 5), extends across and is secured to the sills 22 near the front end of the carriage. The head stock or block is preferably formed of cast metal and a pair of braces 26 are secured to the top and to the sills 22 to withstand the strains incident to centering and supporting heavy logs. The head stock has a vertical cored out recess 28 to receive a block 29 having a hole to receive a live center pin 30. A small block 31 is removably secured to the upper side of the block 29 by a pin 32 which may be driven out to permit the removal of the block 29 from the bottom of the head stock. A screw threaded rod 33 is removably connected to the small block 31 by means of a small channel groove 34 in the upper side thereof within which the reduced end of the rod is swiveled. The screw threaded rod passes through a threaded cap 35 secured to the head stock and closing the upper end of the recess 28 and has a hand wheel 36 for making adjustments of the live center pin. The small block 31 may be removed from the recess with the cap 35 and rod 33 when the pin 32 is removed.

The live center pin 30 (Fig. 2) is slidable and rotatable in the block 29 and extends both forwardly and rearwardly through narrow vertical slots 37 in the faces of the head stock. The rear extension of the pin has two universal joints 38 intermediate its length to permit universal movement of the pin shaft when the pin is adjusted vertically, and the shaft is journaled in two journal bearings 39 mounted on the carriage. A ratchet wheel 40 is fixed on the pin shaft near its rear end and a ratchet lever 41 of usual construction is loosely mounted on the shaft adjacent the ratchet wheel to turn the shaft for adjusting the log after each cut. A pulley or brake drum 42 is fixed to the shaft at its rear end and a brake band 43 embraces the drum (see Fig. 1). The brake band 43 may be operated by a hand lever 44 having a dog cooperating with a toothed segment 45 and connected to the brake band by suitable links and levers.

A tail stock 46 (Figs. 1 and 4) somewhat similar to the head stock 25 is adjustably mounted near the opposite end of the carriage. The tail stock spans the two sills 22 and is preferably supported upon two angle plates 47, the downwardly projecting flanges of which are adapted to ride against the inner surfaces of the sills 22 (see Fig. 4). The tail stock 46 has a vertical cored out recess similar to that of the head stock, and relatively narrow vertical slots 48 in which the pointed or dead center pin 49 is adapted to slide. The center pin is adjustably mounted in a block 50 having flanges 51 bearing against the inner faces of the cored out recess and slidably mounted therein. The block 50 has an integral projection which is adapted to ride in the front vertical slot 48 to prevent lateral movement of the block in the recess. A threaded rod 52 carrying a hand wheel 53 passes through a threaded cap 54, similar to the cap 35 shown in Fig. 5, on the tail stock and is swivelly connected to the block 55, similar to the block 31 in Fig. 5, in a channel groove 56. The block has a pair of arms 57, preferably formed integral with the block, and extending through the vertical slot in the rear side of the tail stock, and having an integral hub 58 at their outer ends which is bored and screw threaded to receive the threaded extension 59 of the center pin 49 for making longitudinal adjustments of the pin by means of a hand wheel 60.

The plates 47 on the sills 22 preferably extend both forwardly and rearwardly of the tail stock and another pair of brackets or braces 26 (Fig. 4), similar to braces on the head stock, are secured to the rear extensions of the plates and the upper portion of the tail stock for bracing it against end thrust.

The mechanism for reciprocating the tail stock on the carriage sills preferably comprises racks 61 (Fig. 4) fixed in slots or recesses in the upper inner edges of the carriage sills 22, and engaged by a pair of pinions 62 mounted on a transverse shaft 63 carried in suitable bearings on the plates 45 at the rear of the tail stock. The plates 47 are cut away below the pinions to allow the teeth on the pinions to mesh with the teeth on the racks. A segment 64 having teeth 65 is secured to the vertical flange of one of the plates 47. A hand lever 66, loosely mounted on shaft 63, carries two latch dogs 67 and 68 adapted to engage the teeth 65 on the segment and the teeth on the pinion 62, respectively, so that when it is desired to move the tail stock the dog 67 may be raised by one of the finger grips 69 on the lever 66 and the lever may be turned in the proper direction to rotate the pinions 62. Long adjustments may be made by oscillating the lever and disengaging the latch dog 68 on its return stroke and then releasing it to engage the pinion during the oscillation in the other direction. When the tail stock is properly set both latch dogs are released to engage the teeth in the segment and pinion, thus holding it in a fixed adjusted position.

The mechanism for reciprocating the carriage (not shown) may be of any suitable conventional construction and forms no part of my invention.

In Fig. 6 I have shown a log 70 in position for quarter sawing and the vertical saws making their first cut of squared flooring, the waste being represented by the cross section of the cut away portion to the right of the vertical saw on the right end of the shaft. The wedge shaped waste strip 71 represents the waste for each succeeding cut and it will be noted that I obtain two perfect boards for each small wedge shaped strip of waste. By this arrangement of saws I can utilize as much as 90% of the material in the log and increase the capacity of the mill.

In the practical operation of my mill the log 70 is properly centered between the head and tail stocks (see Fig. 2) and adjusted vertically by the hand wheels 30 and 53 for the roughing or slab cuts by the saw 21. The live center pin shaft is held against rotary movement by the brake band 39 frictionally engaging the brake drum 38. After each cut is made the log may be adjusted angularly by releasing the brake band and turning the pin 27 by means of the hand lever 36 until the log is brought into the proper angular position for a new cut. Then the brake band is tightened on the brake drum to lock the live center pin 27 against accidental rotary movement while the cut is in progress. After the roughing cuts are made around the circumference of the log the centers are again moved toward the saws to cut squared lumber and the operations are repeated until the log is practically consumed. The attendant has only two simple hand levers to operate on each reciprocation of the carriage after the log has been properly centered.

My machine makes possible the cutting of a plurality of squared boards and a small wedge shaped segment of waste from the log on the first cut, then cutting a plurality of squared boards of flooring upon each forward movement of the carriage after the log is adjusted properly (see the dotted kerfs in Fig. 6). This operation is repeated until the diameter of the stock is too small for another radial cut. By this means only a very thin wedge shaped strip of material is wasted and I am enabled to manufacture a very high grade of perfectly squared rift or quarter sawed flooring.

It will be observed that my mill is particularly adapted for the manufacture of quarter sawed flooring from hard wood but it is equally well adapted for cutting rift flooring from soft stock such as pine, for example.

My invention obviously is not restricted to the particular embodiment thereof herein disclosed.

Having disclosed one illustrative embodiment of my invention, what I claim and desire to secure by Letters Patent is:—

1. In a sawing machine, a plurality of parallel vertical saws, a horizontal saw adapted to cut across the kerfs cut by the vertical saws, a carriage above said saws, a head stock and tail stock on the carriage, means for centering a log between said head stock and tail stock comprising a live center pin passing through the head stock and a dead center pin longitudinally adjustable in the tail stock, both of said centering pins being vertically adjustable, said live centering pin having a flexible extension journalled at its free end on the carriage and adapted to permit vertical adjustments of said pin, lever operable means on the carriage connected to said journalled extension for rotating the pin, and means for locking the pin in adjusted positions.

2. In a sawing machine a plurality of parallel vertical saws, a saw adapted to cut across the kerfs cut by the vertical saws, a carriage above said saws, a head stock and tail stock on the carriage, means for centering a log between said head stock and tail stock, comprising a live center pin passing through the head stock and a dead center pin longitudinally adjustable in the tail stock, both of said centering pins being vertically adjustable, said live centering pin extending through said head stock and having a flexible extension, a lever and ratchet for rotating the flexible extension and a brake for holding it in adjusted angular positions.

3. A sawing machine comprising, in combination, a plurality of vertical parallel circular saws mounted on the same shaft, a horizontal saw overhanging said vertical saws, a reciprocating carriage above said saws, log centering means on said carriage, said log centering means comprising a head stock and a movable tail stock, a live centering pin in the head stock, and a dead centering pin in the tail stock, said live centering pin being adjustable vertically in said head stock and having a flexible extension rotatably mounted on said carriage, a lever and ratchet on said extension for rotating said centering pin, and brake means on said extension for holding said centering pin in angularly adjusted positions.

4. A sawing machine for manufacturing quarter sawed lumber from logs comprising, in combination, a reciprocating carriage, a head stock and tail stock on said carriage, a live centering pin in the head stock and a dead centering pin in the tail stock for supporting the log, said live centering pin having a flexible extension journalled on the carriage and being slidably mounted in the head stock to permit vertical adjustments, ratchet mechanism on the extension for rotating the pin, lever controlled brake means also on said extension for holding the pin in adjusted positions, and a plurality of saws below said carriage constructed and arranged to cut substantially square boards from the centered log.

5. A sawing machine, comprising in combination, a reciprocating carriage, a head stock, a tail stock adjustably mounted on the carriage, a live centering pin slidably mounted in the head stock and having a flexible extension, a dead centering pin in the tail stock, both of said pins being vertically adjustable, lever and ratchet mechanism on the flexible extension for adjusting the live centering pin angularly, lever and ratchet mechanism carried by the tail stock for adjusting it longitudinally in either direction on the carriage, the means for cutting and severing lumber from centered logs on said carriage.

6. A sawing machine comprising, in combination, a plurality of saws for cutting boards from a centered log, a carriage mounted adjacent said saws, a head stock and tail stock on the carriage, centering means adjustably mounted in the head stock and tail stock, said tail stock being longitudinally adjustable on the carriage, and means for moving said tail stock comprising a pair of racks on the carriage, a shaft on the tail stock having pinions meshing with the racks, a hand lever loosely mounted on said shaft having a dog engaging the teeth on one of said pinions and adapted to rotate it in either direction, a toothed segment secured to the tail stock adjacent said lever and a second latch dog on the lever for engaging said segment to lock the tail stock in longitudinally adjusted positions.

In testimony whereof, I have signed my name to this specification.

ROBERT THEODORE RUSH.